May 14, 1929.  G. F. MEIER  1,713,292
LUBRICATOR
Filed April 9, 1928
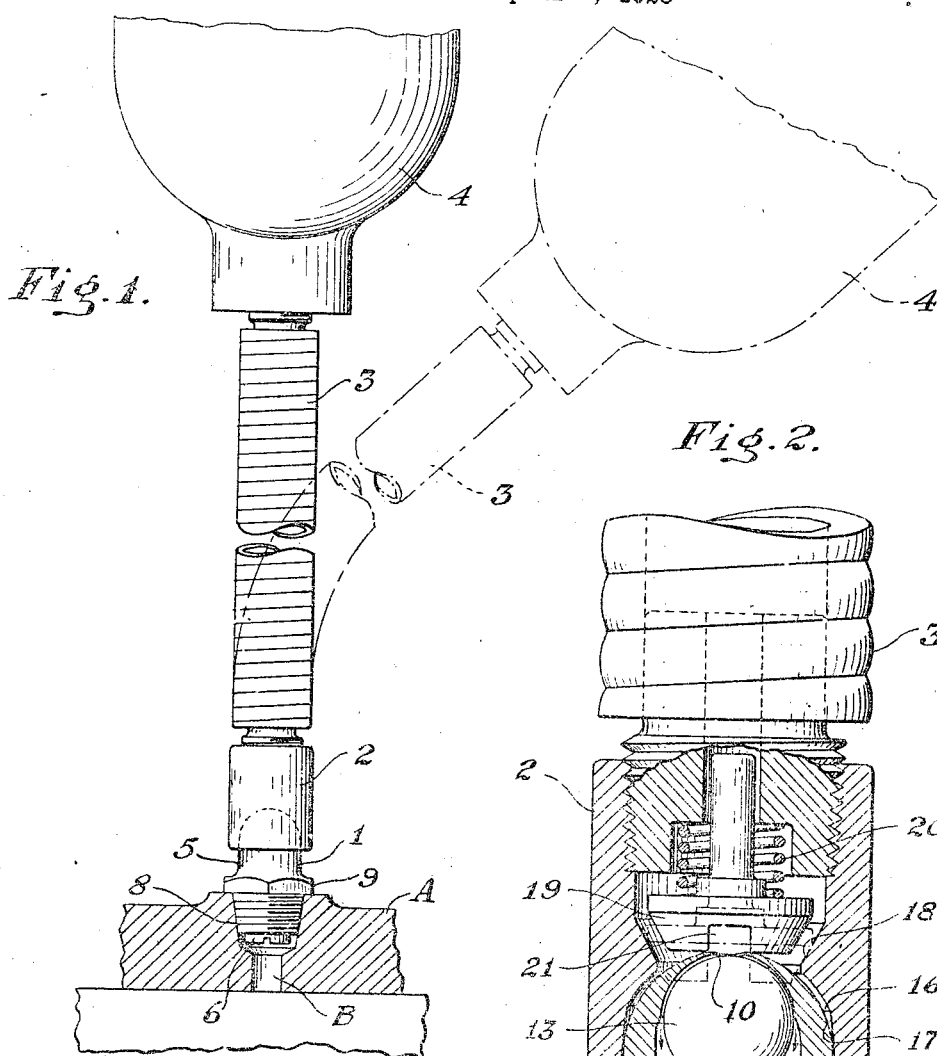
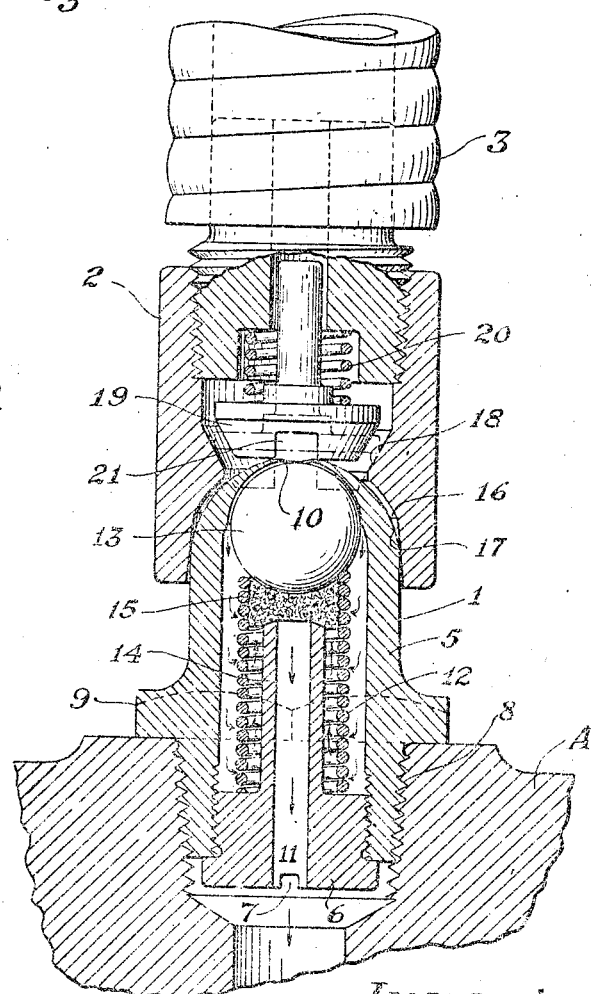
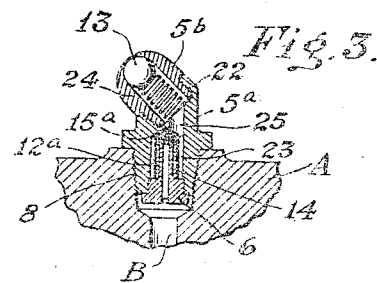
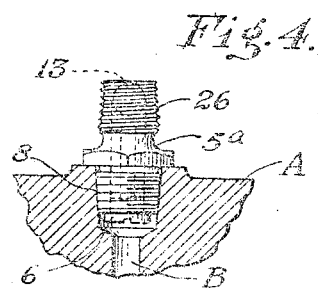
Inventor
George F. Meier.
by S. Jay Teller
Attorney.

Patented May 14, 1929.

1,713,292

UNITED STATES PATENT OFFICE.

GEORGE F. MEIER, OF WETHERSFIELD, CONNECTICUT.

LUBRICATOR.

Application filed April 9, 1928. Serial No. 268,715.

The invention relates particularly to a lubricator of the type which is commonly known as an oil cup or nipple and is adapted to be secured in relatively fixed position on a mechanism to be lubricated, the said lubricator serving as a means for the reception of lubricant from a suitable separate supply device, such as a "gun" or pump adapted to supply the lubricant under pressure. A lubricator embodying the invention is particularly adapted for use with a fluid lubricant such as oil, but as to some of its features it is not so limited and may be used with semi-liquid lubricants such as grease. A lubricator embodying the invention may be used on automobiles, machine tools or on any other mechanisms or machines requiring frequent and effective lubrication.

It is a well recognized fact that a very large part of the excessive wear and depreciation which frequently occurs in mechanical devices of all kinds is caused by dirt or grit carried by the lubricant into bearings or other parts requiring lubrication. A general object of the invention is to provide a lubricator or oiler of the type described which will effectively strain or filter or otherwise clean the oil of other lubricant to positively prevent any dirt or grit from being carried thereby into the working parts of the mechanism.

A more specific object of the invention is to provide a lubricator of the type described having a helical coil of wire so positioned and having its convolutions so spaced as to form a strainer for the lubricant. The said coil may conveniently also serve as the spring for holding the ball or other valve closure at the inlet opening of the device.

A further specific object of the invention is to provide a lubricator of the type described having a body of filtering material combined in a novel manner with other parts to also form a strainer for the lubricant.

Other objects of the invention will be apparent from the following specification and claims.

In the accompanying drawing I have shown certain embodiments of the invention, but it will be understood that the drawing is for illustrative purposes only and is not to be construed as defining or limiting the scope of the invention, the claims forming a part of this specification being relied upon for that purpose.

Of the drawing:

Fig. 1 is a fragmentary elevational view of the lubricator combined with a lubricant supply device.

Fig. 2 is an enlarged fragmentary longitudinal sectional view.

Figs. 3 and 4 are sectional and elevational views respectively on the same scale as Fig. 1 but showing other embodiments of the invention.

Referring particularly to Fig. 1 of the drawing, 1 represents as an entirety a lubricator or oiler adapted to be secured in relatively fixed position on a mechanism to be lubricated. The lubricator 1 is shown as threaded into a casting A having an oil hole B therein. For supplying lubricant to the lubricator 1 use is preferably made of a device adapted to form a tight joint with the said lubricator and to supply lubricant thereto under pressure. I have shown a connection device 2 which is attached by means of a pipe 3 to a suitable oil or grease gun or other pressure device 4. The pipe 3 may be made flexible as indicated, but this is not essential.

The details of the lubricator 1 are shown in Fig. 2. The main body of the lubricator comprises a hollow shell 5 and a plug 6 closing the inner end of the shell. The plug is preferably threaded into the shell and is provided with a screw driver slot 7 to facilitate assembly and disassembly. As shown the shell 5 is externally threaded at 8 in order that it may be conveniently held in place, as for instance on the casting A, but if desired other means of mounting and connection may be provided. When the shell 5 is threaded as shown it is preferably provided with a square or hex at 9 in order that it may be conveniently turned. The body of the lubricator is provided with separate lubricant inlet and outlet openings, and as shown there is provided an inlet opening 10 in the top of the shell 5 and an outlet opening 11 in the plug 6 at a position opposite that of the inlet opening.

Positioned within the hollow body of the lubricator is a helical coil of wire 12, which is so disposed that lubricant in passing from the inlet opening 10 to the outlet opening 11 must flow between the convolutions of the coil, for instance, as indicated by the arrows in Fig. 2. In accordance with the invention the convolutions of the coil 12 are very closely spaced so as to enable the coil to serve as a strainer for the lubricant. The exact spacing between adjacent convolutions may vary, but the spacing may be as small as .002" or .001" or even less. Inasmuch as all lubricant must flow between the coil convolutions it will be obvious that any particles of dirt or grit larger than the aforesaid spacing will be caught by the coil and prevented from passing to the outlet opening.

Preferably a closure element is provided for the inlet opening 10, this ordinarily being in the form of a ball 13. When such a closure element or ball is provided the aforesaid coil 12 is constructed to also act as a spring to yieldingly hold the said element or ball in inlet closing position. The upper end of the spring abuts against the ball and the lower end abuts against the plug 6. By reference to Fig. 2 it will be observed that the ball 13 can be pressed downward or inward to permit the lubricant to flow inward through the opening 10 and around the ball as indicated by the arrows. The ball may be forced inward by the direct mechanical engagement therewith of the lubricant supply device or it may be forced inward by the pressure of the lubricant itself. After passing around the ball the lubricant must flow inward between the convolutions of the spring 12 before entering the outlet opening 11, being strained in the manner already described. The plug 6 not only provides an abutment or support for the spring but also serves as an annular shelf for limiting longitudinal flow of the lubricant and thus compelling it to pass between the convolutions of the spring.

The spacing between adjacent convolutions of the spring 12, as herein described and claimed, is that which exists with the spring expanded to hold the ball 13 in its inlet closing position. Obviously the compression of the spring, by reason of the opening movement of the ball, serves to decrease the spacing and to thus increase the effectiveness of the spring as a strainer.

Preferably there is provided a tube or riser 14 within the body of the lubricator which communicates at one end with the outlet opening 11 and which is at least partly open at the other end. The coil or spring 12 is positioned to surround the tube 14, which is considerably smaller than the coil. As shown the tube 14 is formed integrally with the plug 6 but it may be formed separately if preferred. When the lubricator is positioned vertically as shown in Fig. 3, the tube or riser 14 cooperates with the body or shell to form a small settling chamber which serves to retain a small body of lubricant after the completion of the lubricating operation. When the lubricant is oil this enables any dirt or grit to settle to the bottom, the settling action taking place both outside and inside the coil. Thereafter, when additional oil is forced in it pushes this clarified oil ahead of it into the tube 14 and the outlet opening 11. This clarified oil must flow upward, as indicated by the arrows, in order to enter the tube. Thus the provision for settling further insures clean oil for the bearing or other part to be lubricated. A somewhat similar settling action, though possibly not quite as effective, is obtained when the lubricator is positioned horizontally.

It is sometimes desirable, whether a closure element such as 13 is or is not included, to provide a body or filtering material 15 within the coil 12 and so located that the lubricant must flow through it to be additionally strained or filtered before entering the outlet opening. The filtering material may be soft wool felt or other material which will not easily harden. When there is a tube 14 the felt 15 is positioned at the entrance end of the tube and when there is a closure element such as the ball 13 the felt is positioned between the end of the tube and the ball. The felt is surrounded by the coil or spring 12 and is thus held in place. It will be clear that the felt 15 will catch any very fine particles of dirt or grit which might pass between the convolutions of the coil. Inasmuch as the major portion of the oil moves upward toward the felt I avoid any tendency to so compress the felt so as to unduly restrict the flow of oil.

From the foregoing description it will be apparent that I have provided a lubricator or oiler which very effectively serves to strain and clarify the oil. When all of the features of the invention are provided, as shown, the oil is cleaned by the straining action of the coil 12, by the straining or filtering action of the felt 15 and by the settling action, all as heretofore described. The construction is such that the lubricator cannot easily get out of order or fail to function properly. All parts are simple and inexpensive and capable of being easily manufactured in large quantities, and the said parts can be easily assembled. The device can be taken apart for cleaning by simply unscrewing the plug 6, no tool being required other than an ordinary screw driver. When disassembled all parts can be easily cleaned.

The lubricator or oiler 1 and the connector 2 may be formed in any usual or preferred way to form a tight joint, but in the construction illustrated I form the outer end of the shell 5 with a partly spherical surface 16 and I form the body of the connector with a conical interior surface 17 adapted to engage and fit the surface 16. The surface 17 is formed with a slight taper, commonly known as a "sticking taper" and having an included angle of not over 17° and varying according to conditions. The connector 2 may be engaged with the lubricator by endwise movement coupled if desired with a slight rotative movement. The rotative movement serves to lock the parts together and also serves to wipe off any accumulated dirt on the engaging surfaces 16 and 17. The "sticking taper" forms a tight but easily releasable joint. The spherical surface 13 permits the connector to properly engage the oiler notwithstanding a limited amount of misalignment.

Preferably the connector 2 is provided with a valve which prevents the escape of lubricant when the connector is disengaged from the oiler. I have shown the connector as formed with a conical valve seat 18. A valve closure 19 is provided which is normally held against the seat 18 by means of a spring 20. The valve closure is so related to the other parts that it is engaged by the end of the oiler and forced to open position as shown in Fig. 2. In order that the oil or other lubricant may more easily reach the inlet opening 10 the valve closure 19 is provided with a transverse slot 21.

With the connector 2 in place as shown oil or other lubricant can be forced by the gun or pump into the oiler, the ball 13 being pushed inward and the lubricant flowing to the outlet opening 11 all as already described. Upon disengagement of the connector the valve 19 immediately closes and prevents the escape of lubricant.

I do not claim as a part of the present invention the construction of the lubricator and connector whereby the joint between them is formed by a "sticking taper," and I do not claim the details of construction of the connector. These features are disclosed and claimed in my copending application for lubricator connecting means, Serial No. 346,381 filed March 12, 1929 as a continuation-in-part of this present application.

The lubricator may be formed with the outer end portion at an angle to the inner end portion as shown in Fig. 3, to facilitate engagement of the connecting device 2 in certain positions. In this case the shell of the lubricator comprises two parts 5ª and 5ᵇ, the inner portion of the part 5ª and the outer portion of the part 5ᵇ being similar respectively to the inner and outer portions of the shell 5 shown in Fig. 2. The part 5ª has a threaded hole 22 therein at an angle to the axis of the main opening or hole 23 therein and the part 5ᵇ is threaded to enter and fit the said threaded hole in the part 5ª, the two parts thus being connected together.

The inlet opening in the part 5ª is normally closed by a ball 13 normally held in inlet closing position by a spring 24. A relatively small eccentric hole 25 in the part 5ª serves as a lubricant passage from the interior of the part 5ᵇ to the main hole 23.

Connected with the part 5ª is a plug 6 carrying a tube 14, both formed as already described. A coil of wire 12ª surrounds the tube 14, the inner end engaging the plug 6 and the outer end engaging the end of the hole 23. The coil 12ª, while having no function as a spring, has the same straining function as already described in connection with the coil 12. Preferably a body of felt 15ª is interposed between the end of the tube 14 and the end of the hole 23, being held in place by the coil 12ª. This felt has the same function as already described in connection with the felt 15.

Fig. 4 I have shown a construction which is identical with that in Fig. 2, except that the outer end of the shell 5ᶜ is threaded at 26 so as to be adapted to be relatively permanently connected with a lubricant supply pipe. Devices as shown in Fig. 4 are particularly adapted for machines which are provided with pipes connected with a main or central pressure device and leading to the respective bearings. By the use of such a system of oilers embodying my invention I not only insure clean oil as already described but I provide equal resistance at all of the bearings, thus insuring equal amounts of oil.

What I claim is:

1. In a lubricator of the type disclosed, the combination of a hollow body having separate lubricant inlet and outlet openings, and a helical coil of wire so disposed within the said body that lubricant in passing from the inlet opening to the outlet opening must flow between the convolutions of the coil, which convolutions are closely spaced to enable the coil to serve as a lubricant strainer.

2. A lubricator as described in claim 1 wherein the spacing between adjacent convolutions of the coil is not over .002".

3. In a lubricator of the type disclosed, the combination of a hollow body having separate lubricant inlet and outlet openings, an element forming a valve closure for the inlet opening, and a helical coil spring within the said body engaging the said element to yieldingly hold it in inlet closing position, the said spring being so disposed that lubricant in passing from the inlet opening to the outlet opening must flow between the convolutions of the spring, which convolutions are closely spaced to enable the spring to serve as a lubricant strainer.

4. A lubricator as described in claim 3 wherein the spacing between adjacent convolutions of the spring is not over .002" and wherein there is provided an annular shelf at the end of the spring opposite the valve closure for limiting longitudinal flow of the lubricant and thus compelling it to pass between the convolutions of the spring.

5. In a lubricator of the type disclosed, the combination of a hollow body having separate lubricant inlet and outlet openings, a helical coil of wire so disposed within the said body that lubricant in passing from the inlet opening to the outlet opening must flow between the convolutions of the coil, which convolutions are closely spaced to enable the coil to serve as a lubricant strainer, and a body of felt within the coil and so located that the lubricant must flow therethrough to be filtered before entering the outlet opening.

6. In a lubricator of the type disclosed, the combination of a hollow body having separate lubricant inlet and outlet openings, a helical coil of wire within the body, the said coil being so disposed that lubricant after entering the inlet opening must flow inward between the convolutions of the coil, which convolutions are closely spaced to enable the coil to serve as a lubricant strainer, and a tube within the coil communicating with the outlet opening at one end and at least partly open at the opposite end, the said tube cooperating with the said hollow body to provide a settling chamber for retaining a small quantity of lubricant.

7. In a lubricator of the type disclosed, the combination of a hollow body having separate lubricant inlet and outlet openings, a tube within the body at least partly open at one end and communicating with the outlet opening at the other end, a ball positioned in alignment with the tube and forming a valve closure for the inlet opening, and a helical coil spring within the body surrounding the tube and engaging the said ball to yieldingly hold it in inlet closing position, the said spring being so disposed that lubricant after entering the inlet opening must flow inward between the convolutions of the spring, which convolutions are closely spaced to enable the spring to serve as a lubricant strainer.

8. In a lubricator of the type described, the combination of a hollow shell having an inlet opening at one end, a plug threaded into the shell at the opposite end and having an outlet opening therein, a tube formed integrally with the plug and extending into the shell in alignment with the said outlet opening, a ball positioned in alignment with the tube and forming a valve closure for the inlet opening, and a helical coil spring within the body surrounding the tube and engaging the said ball to yieldingly hold it in inlet closing position, the said spring being so disposed that lubricant after entering the inlet opening must flow inward between the convolutions of the spring, which convolutions are closely spaced to enable the spring to serve as a lubricant strainer.

9. In a lubricator of the type disclosed, the combination of a hollow body having separate lubricant inlet and outlet openings, a tube within the body at least partly open at one end and communicating with the outlet opening at the other end, an element positioned in alignment with the tube and forming a valve closure for the inlet opening, a helical coil spring within the body surrounding the tube and engaging the said element to yieldingly hold it in inlet closing position, and a body of felt located within the spring and between the end of the tube and the said valve element, the said felt serving to filter the lubricant before it enters the said tube.

10. In a lubricator of the type disclosed, the combination of a hollow body having separate lubricant inlet and outlet openings, a tube within the body at least partly open at one end and communicating with the outlet opening at the other end, an element positioned in alignment with the tube and forming a valve closure for the inlet opening, a helical coil spring within the body surrounding the tube and engaging the said element to yieldingly hold it in inlet closing position, the said spring being so disposed that lubricant after entering the inlet opening must flow inward between the convolutions of the spring, which convolutions are closely spaced to enable the spring to serve as a lubricant strainer, and a body of felt located within the spring and between the end of the tube and the said valve element, the said felt serving to filter the lubricant before it enters the said tube.

In testimony whereof, I subscribe my name to this specification.

GEORGE F. MEIER.